(12) United States Patent
Ramanujan et al.

(10) Patent No.: US 7,356,596 B2
(45) Date of Patent: Apr. 8, 2008

(54) PROTECTING NETWORKS FROM ACCESS LINK FLOODING ATTACKS

(75) Inventors: Ranga S. Ramanujan, Eden Prairie, MN (US); Maher N. Kaddoura, Eden Prairie, MN (US); Xiaoming Wu, Eden Prairie, MN (US); Kevin S. Millikin, St. Paul, MN (US)

(73) Assignee: Architecture Technology Corp., Eden Prairie, MN (US)

( * ) Notice: Subject to any disclaimer, the term of this patent is extended or adjusted under 35 U.S.C. 154(b) by 672 days.

(21) Appl. No.: 10/057,043

(22) Filed: Jan. 25, 2002

(65) Prior Publication Data

US 2003/0110288 A1 Jun. 12, 2003

Related U.S. Application Data

(60) Provisional application No. 60/338,978, filed on Dec. 7, 2001.

(51) Int. Cl.
*G06F 15/16* (2006.01)
*G06F 15/173* (2006.01)
*G06F 11/00* (2006.01)
*G06F 15/177* (2006.01)
*G08B 23/00* (2006.01)

(52) U.S. Cl. ............... 709/227; 709/238; 726/22

(58) Field of Classification Search ............... 709/238, 709/227, 235, 201; 713/201; 726/22
See application file for complete search history.

(56) References Cited

U.S. PATENT DOCUMENTS

| 6,092,113 | A  | * | 7/2000  | Maeshima et al. ......... 709/230 |
| 6,353,593 | B1 | * | 3/2002  | Chen et al. .................. 370/216 |
| 6,473,863 | B1 | * | 10/2002 | Genty et al. ................. 713/201 |
| 6,738,910 | B1 | * | 5/2004  | Genty et al. ................. 713/201 |
| 6,880,090 | B1 | * | 4/2005  | Shawcross .................. 713/201 |
| 6,920,134 | B2 | * | 7/2005  | Hameleers et al. ......... 370/389 |
| 2002/0083175 | A1 | * | 6/2002 | Afek et al. .................. 709/225 |
| 2002/0099854 | A1 | * | 7/2002 | Jorgensen .................... 709/249 |
| 2003/0016679 | A1 | * | 1/2003 | Adams et al. ............... 370/401 |
| 2003/0093691 | A1 | * | 5/2003 | Simon et al. ................ 713/201 |

(Continued)

OTHER PUBLICATIONS

S. Kent, and R. Atkinson, "Security Architecture for the Internet Protocol," IETF RFC 2401, Nov. 1998.

(Continued)

*Primary Examiner*—Jason Cardone
*Assistant Examiner*—Brian J Gillis
(74) *Attorney, Agent, or Firm*—Shumaker & Sieffert, P.A.

(57) ABSTRACT

Automated techniques are described that provide continuous, uninterrupted operation of the secure packet tunnels in spite of access link flooding attacks. A system is described that includes a source device and a destination device coupled to a network. The source and destination devices may comprise, for example, edge routers that couple local area networks to the network via access links. The source device and the destination device establish a packet tunnel that has a source network address and a destination network address. Upon detecting a network attack, the destination device selects a new network address for at least one of the source network address and the destination network address and establishes a new packet tunnel with the source device. The source network address and the destination network address may comprise port numbers, Internet Protocol (IP) addresses, or other information describing the source and destination devices.

30 Claims, 4 Drawing Sheets

U.S. PATENT DOCUMENTS

2006/0050719 A1* 3/2006 Barr et al. .................. 370/401

OTHER PUBLICATIONS

K. Hamzeh, et al., "Point-to-Point Tunneling Protocol," IETF RFC 2637, Jul. 1999.

W. Townsley, et al., "Layer Two Tunneling Protocol (L2TP)," IETF RFC 2661, Aug. 1999.

K.J. Houle, and G.M. Weaver, "Trends in Denial of Service Attack Technology," Technical Report, CERT Coordination Center, Oct. 2001.

D. Moore, G.M. Voelker, and S. Savage, "Inferring Internet Denial-of-Service Activity," Proceedings of the 2001 USENIX Security Symposium, Washington, D.C., Aug. 2001.

R. Braden, et al., "Resource Reservation Protocol (RSVP)," IETF RFC 2205, Sep. 1997.

S. Bhattachayya, et al., "An Overview of Source-Specific Multicast (SSM) Deployment," IETF Internet Draft: draft-ietf-ssm-overview-01.txt, Aug. 2001.

S. Deering, "Host Extensions for IP Multicasting," IETF RFC 1112, Aug. 1989.

G. Banga, P. Druschel, and J. Mogul, "Resource Containers: A New Facility for Resource Management in Server Systems," in Proceedings of the 1999 USENIX/ACM Symp. on Operating System Design and Implementation, Feb. 1999.

S.M. Bellovin et al., "ICMP Traceback Messages," Internet Draft: draft-ietf-I trace-01.txt, Oct. 2001.

Cisco Systems, Configuring TCP Intercept (Prevent Denial-of-Service Attacks), Cisco IOS Documentation, Dec. 1997.

S. Savage, D. Wetherall, A. Karlin, and T. Anderson, "Network Support for IP Traceback," IEEE/ACM Trans. on Networking, vol. 9, No. 3, Jun. 2001.

D. Song and A. Perrig, "Advanced and Authenticated Marking Schemes for IP Traceback," Jun. 2000.

O. Spatscheck and L. Peterson, "Defending Against Denial of Service Attacks in Scout," Proceedings of the 1999 USENIX/ACM Symp. on Operating System Design and Implementation, Feb. 1999.

R. Stone, "CenterTrack: AN IP Overlay Network for Tracking DoS Floods," Proceedings of the 2000 USENIX Security Symposium, Dec. 2000.

* cited by examiner

PROTECTING NETWORKS FROM ACCESS LINK FLOODING ATTACKS

This application claims priority from U.S. Provisional Application Ser. No. 60/338,978, filed Dec. 7, 2001, the contents being incorporated herein by reference.

STATEMENT REGARDING FEDERALLY SPONSORED RESEARCH OR DEVELOPMENT

This invention was made with Government support under Contract N66001-00-C-8055 awarded by SPAWAR Systems Center. The Government may have certain rights in this invention.

TECHNICAL FIELD

The invention relates to computer networks and, more particularly, to improving resistance to network attacks.

BACKGROUND

A large number of organizations and enterprises have geographically dispersed operations, and typically have a local area network (LAN) supporting the information processing needs at each of these locations. Traditionally, interconnection of the dispersed LANs has been accomplished using dedicated communication lines leased from a service provider. In addition, Internet access at each site is typically accomplished using another leased line (such as a T1 or T3 line) that connects the site to a local Internet service provider. With the advent of virtual private network (VPN) technology, organizations can now accomplish inter-site network connectivity over the Internet. By obviating the need for dedicated lines between the sites, this solution yields substantial cost savings.

A VPN operates by transporting traffic between the sites using secure packet tunnels established over the Internet between these sites. Currently, there are three tunneling protocols that are used in a majority of commercially available VPN products, i.e., IP Security (IPSec), Point-to-Point Tunneling Protocol (PPTP), and Layer 2 Tunneling Protocol (L2TP). The tunnels established and maintained by these protocols may be viewed as implementing virtual leased lines between the geographically distributed LANs of an enterprise.

Although cost considerations clearly favor the use of inter-site VPNs over dedicated lines, one major impediment to the widespread employment of this technology is its vulnerability to network attacks. One type of network attack that represents a serious threat to enterprises operating over the Internet is the Distributed Denial-of-Service (DDoS) attack. A notable form of DDoS attack is the access link flooding attack that occurs when a malicious party directs spurious packet traffic over an access link connecting an edge network of an enterprise to the public Internet in an attempt to sabotage network operation. The attack traffic may be generated simultaneously from multiple points on the network from machines that have been "hijacked" or subverted by the attacker. This traffic flood, when directed at a victim edge network, can inundate the access link connecting the site to its Internet service provider. By usurping access link bandwidth from the VPN tunnels operating over that link, the attack can cause partial or total denial of the VPN service and disrupt operations of any mission-critical application that relies on that service.

A number of techniques have been proposed recently to detect and counter access link flooding attacks. These techniques typically rely on mechanisms that must be partially or wholly implemented within the service provider network infrastructure to identify the source(s) of attack traffic. Once this is accomplished, generally manual actions are required to neutralize the effect of this traffic. This may involve, for instance, the installation of filters to discard attack traffic at the ingress to the service provider network. With this semi-automated approach, the time interval between the onset of an attack and its neutralization can be expected to be on the order of minutes at best and hours at worst. This interval represents a window of vulnerability for a VPN operating over the attacked access link. Furthermore, when sending the packet traffic, the perpetrator may spoof a network address trusted by the enterprise, thereby making it difficult to filter the spurious traffic from the access link.

SUMMARY

In general, the invention is directed to techniques for protecting edge networks against access link flooding attacks. For example, automated techniques are described for building DoS-resistant (or survivable) VPNs that provide continuous, uninterrupted operation of the secure packet tunnels in spite of access link flooding attacks. In contrast to existing infrastructure-based techniques for detecting and countering these attacks, the techniques described herein can be implemented within the enterprise edge networks (i.e., LAN sites connecting to the Internet). That is, the survivability mechanisms associated with this approach can be implemented within the customer premises equipment, and require no modifications or additions to equipment in the network infrastructure owned by the network service provider. In that sense, the techniques presented here can be viewed as "organic" survivability techniques for protecting VPNs from DoS attacks.

In one embodiment, the invention is directed to a system including a source device and a destination device coupled to a network. The network devices may comprise, for example, edge routers that couple local area networks to the network via access links. The source device and the destination device establish a packet tunnel that has a source network address and a destination network address. Upon detecting a network attack, the destination device selects a new network address for at least one of the source network address and the destination network address, and establishes a new packet tunnel. The source network address and the destination network address may comprise any combination of port numbers, Internet Protocol (IP) addresses, and other information within a packet describing the source and destination devices.

In another embodiment, the invention is directed to a system comprising a source device that is coupled to a network by a first access link and that originates a packet tunnel. A destination device is coupled to the network by a second access link and terminates the packet tunnel. The destination device establishes a truncated reservation path within the second access link for the packet tunnel.

In another embodiment, the invention is directed to a system comprising a source network device that originates a first packet tunnel. An intermediate network device terminates the first packet tunnel and originates a second packet tunnel. A destination network device terminates the second packet tunnel. The intermediate network device de-encapsulates packets received from the first packet tunnel and re-encapsulates the packets for communication to the destination device via the second packet tunnel.

In another embodiment, the invention is directed to method comprising establishing a packet tunnel having a source network address and a destination network address. The method further comprises selecting a new network address for at least one of the source network address and the destination network address upon detecting a network attack, and establishing a new packet tunnel using the new network address.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
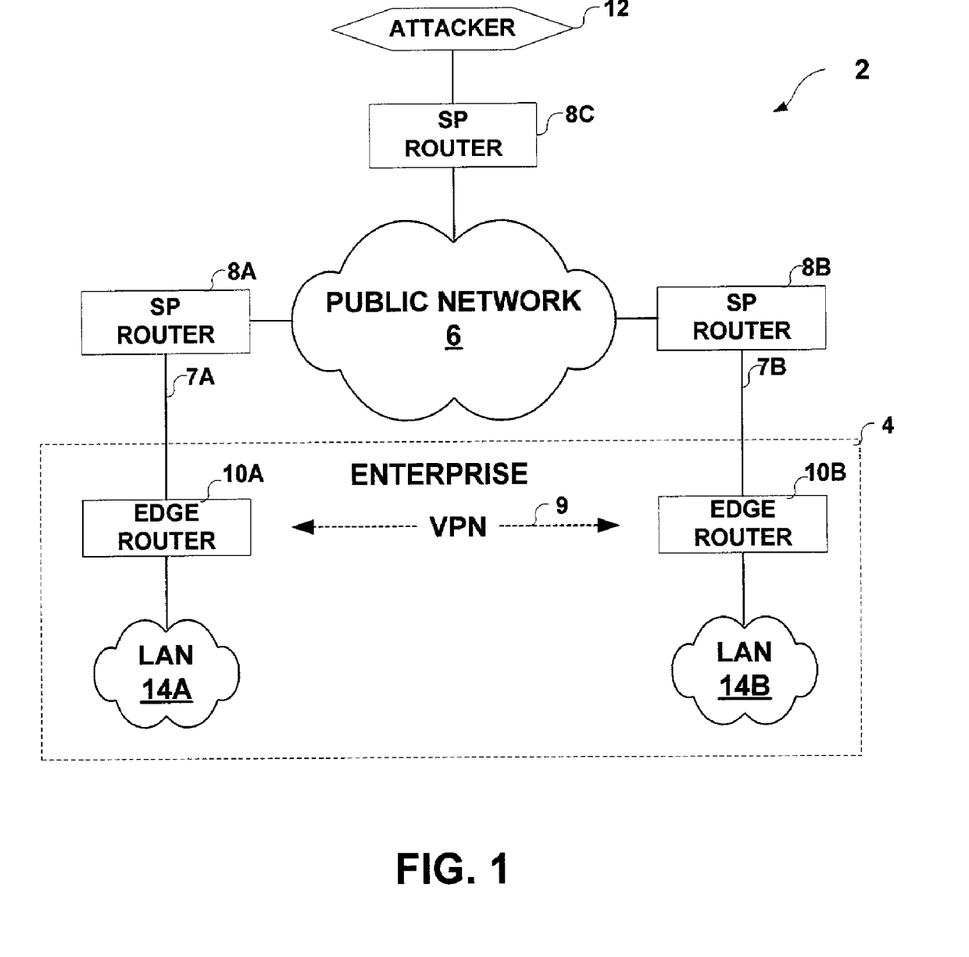
FIG. 1 is a block diagram illustrating an example Virtual Private Network (VPN) networking environment in which an enterprise is composed of two geographically distributed local area networks (LANs).
Figure 2:
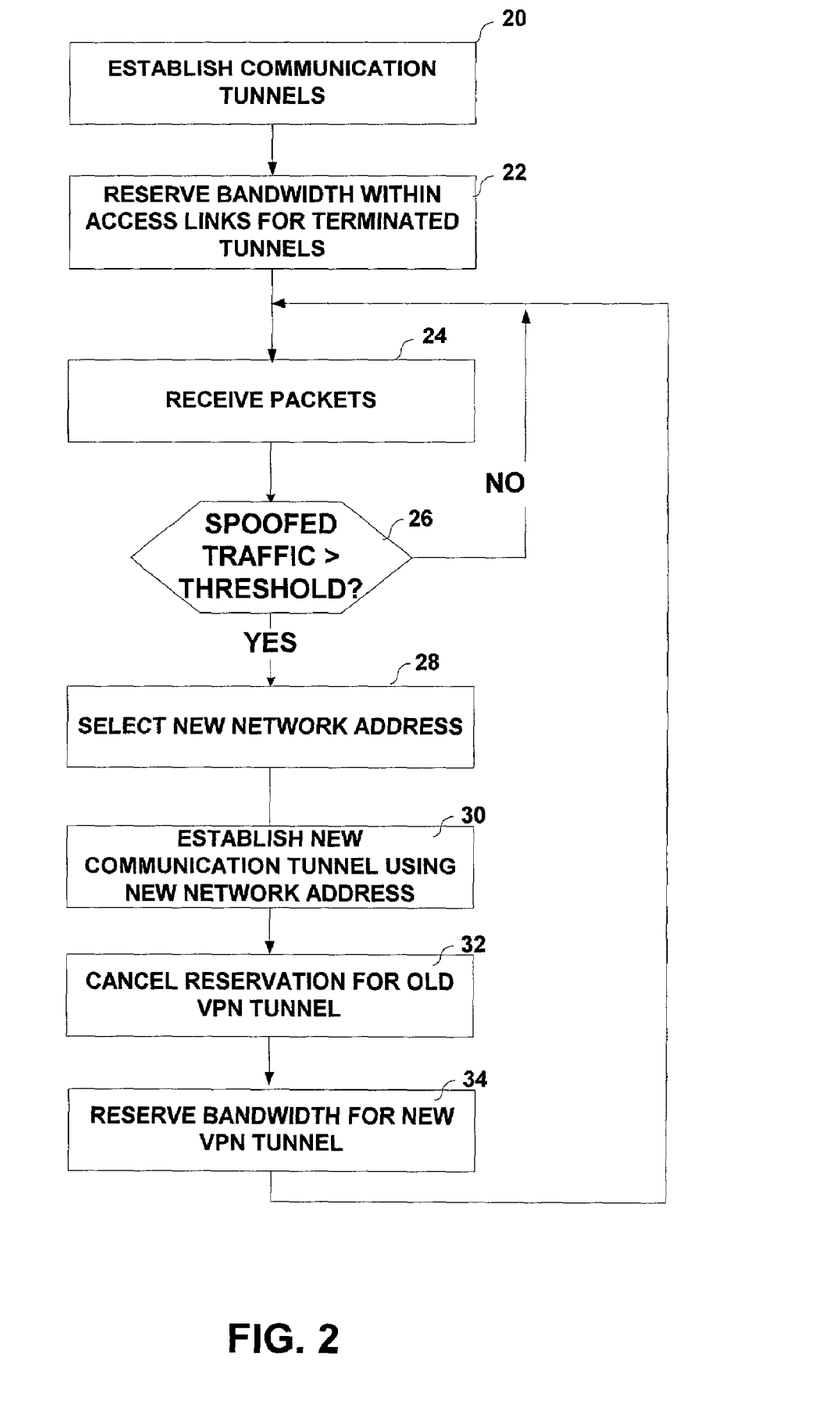
FIG. 2 is a flowchart illustrating example operation of edge routers to protect the VPN against network attacks.

FIG. 1 is a block diagram illustrating an example Virtual Private Network (VPN) networking environment 2 in which enterprise 4 is composed of two geographically distributed local area networks (LANs) 14A, 14B. Accordingly, LANs 14 owned and managed by Enterprise 4 can be viewed as edge networks on public network 6. LANs 14 are securely coupled to form one virtual network using packet tunnels of VPN 9 implemented over the public network 6. Although an actual deployment of VPN 9 may contain a number of dispersed customer LANs 14, for simplicity, FIG. 2 shows only two customer LANs 14A, 14B served by the edge routers 10A, 10B. The packet tunnels of VPN 9 may make use of a variety of tunneling protocols including IP Security (IPSec), Point-to-Point Tunneling Protocol (PPTP), and Layer 2 Tunneling Protocol (L2TP), and the like.

Customer edge routers 10A, 10B represent customer premise equipment that connects LANs 14 to public network 6 via a service provider network. In particular, LANs 14 are coupled to service provider (SP) routers 8 via access links 7 and edge routers 10. For exemplary purposes, edge routers 10 are described as terminating the packet tunnels of VPN 9, although other components of environment 2 may terminate the tunnels including SP routers 8 and other devices within LANs 14.

Edge router 10A, for example, encapsulates packets originating from LAN 14A and destined for LAN14B. The encapsulated packet is thus encrypted before it is transported over public network 6 to the destination edge router 10B. The encapsulated packet also carries authentication data that can be used by the destination edge router 10B to authenticate or verify the integrity of the content of the received packet. Upon successful authentication of a VPN packet, edge router 10B decrypts the encapsulated packet contained within and forwards it to the appropriate device within LAN 14B. Thus, edge routers 10 may serve as general routers as well as VPN gateways for initiating and terminating packet tunnels of VPN 9.

The interface of each of edge routers 10 to public network 6 may be configured to one or more globally reachable (or public) IP addresses, a subset of which can be reserved for use as VPN tunnel end points. The techniques described herein make use of the fact that the globally reachable network addresses associated with the two end points of a VPN tunnel are assigned by edge routers 10. The source network address and the destination network address may comprise any combination of port numbers, Internet Protocol (IP) addresses, and other information within a packet describing the source and destination devices.

According to the principles of the invention, when establishing a VPN tunnel, each of edge routers 10 provisions a set of alternate public network addresses for each VPN tunnel terminating on it. One of these addresses is selected as the current address of the tunnel endpoint. The other addresses are denoted as standby addresses, any of which may be dynamically configured as the current address of the VPN endpoint when needed. Each of edge routers 10 may include a storage medium to store the set of addresses, and a programmable processor containing executable instructions for controlling the functionality of the router.

A packet tunnel of VPN 9, such as an IPSec-based VPN tunnel, is uniquely identified by the current addresses of the two endpoints of the tunnel. A VPN packet tunnel carries two uni-directional flows between the endpoints. Each flow is uniquely identified by a flow label, an ordered pair (A,B), whose first element A represents the source address of a packet flow and whose second element B represents the destination of the flow.

For each VPN tunnel terminating on it, each of edge routers 10 establishes a truncated path reservation by reserving an available fraction of the bandwidth of the respective access link 10 for the packet flow arriving from the other end of the tunnel. In addition, each of edge routers 10 may employs messages defined within IETF's Resource Reservation Protocol (RSVP) standard to convey this bandwidth reservation request to the corresponding SP router 8. Specifically, the RSVP reservation is not an end-to-end reservation between the end points of the flow, as is typical for RSVP usage, but only applies to respective access links 7 connecting edge routers 10 to public network 6.

To accomplish this truncated path reservation, edge routers 10 are configured to transmit RSVP RESV messages to SP routers 8 connecting them to the public network 6. That is, RESV messages from edge router 10A are directed at SP router 8A and RESV messages from 10B are sent to router 8B. Accordingly, when one of SP routers 8 receives a RESV message from one of edge routers 10 across one of access links 7, it performs the requested link bandwidth reservation for the identified packet flow. Therefore, bandwidth is allocated only for the access link 7A or 7B that couples the terminating edge router 10A or 10B to an SP router 8A or 8B.

By reserving bandwidth within access links 7, packets carrying the flow label for a packet tunnel 9 are guaranteed to receive a portion of the access link bandwidth regardless of how saturated the link becomes. Conceptually, edge routers 10 can be viewed as using RSVP reservations to set up provisioned virtual access links to SP routers 8 as well as virtual firewalls at the SP routers 8 to guard the virtual access links. Specifically, the virtual firewalls filter out all traffic flows except that specified by the edge routers 10. Accordingly, the only way an attacker 12 can disrupt the packet flow over the provisioned virtual link is by emitting packets carrying the same flow label as the VPN flow, i.e., by spoofing a source address of the VPN flow. In this manner, spurious packet floods directed at edge routers 10 via attacker 12 having arbitrary source addresses will not be able to flood the virtual access lines reserved for the protected VPN flow.

FIG. 2 is a flowchart illustrating operation of edge routers 10 to protect VPN 9 against such spoofed packet floods. Initially, edge routers 10 establish VPN 9 as two independent unidirectional tunnels for communicating encapsulate packets, one flowing from edge router 10A to edge router 10B, and one flowing in the opposite direction (20). Each tunnel of VPN 9 between edge router 10A and edge router 10B is uniquely identified by the current addresses assigned to the two endpoints of this tunnel by edge router 10A and edge router 10B. Let $A_1$ and $B_1$ be the current addresses of the VPN tunnel endpoints and let $A_2$, $A_3$, . . . $A_n$ and $B_2$, $B_3$, . . . , $B_m$ be the standby addresses for these endpoints, respectively. As part of the initial set up of the tunnels of VPN 9 between edge routers 10A, 10B, the routers exchange the set of standby addresses as well as the address to be used as the current address when the VPN tunnel starts operating. Thus, each of edge routers 10 maintains the current address and the standby addresses of both ends of the VPN tunnel supported by them.

Next, each of edge routers 10 reserves an amount of bandwidth within respective access links 7 to accommodate the packet tunnels that they terminate (22). For example, for a tunnel flowing from edge router 10A to edge router 10B, edge router 10B reserves sufficient bandwidth within access link 7B.

Next, edge routers 10 monitor received packets (24) to detect a network attack in which attacker 12 has spoofed a trusted source address. Generally, edge routers 10 exploit the fact that attacker 12 typically has little or no knowledge of the security information shared between edge routers 10 that is used to encrypt and authenticate encapsulated packets carried by the VPN 9. Accordingly, a spoofed packet arriving at one of edge routers 10 from attacker 12 can be detected by the failure of the packet to pass authentication checks at the edge router 10. If the volume of spoofed traffic arriving at any of edge routers 10 exceeds a certain threshold, it is indicative of a flooding attack on VPN 9 (26).

Upon detection of a spoofed packet flooding attack on one of the VPN tunnels that it terminates, edge router 10A, for example, invokes a failover (or recovery) mechanism for mitigating the impact of the attack on the VPN 9. Conceptually, this failover mechanism reconfigures the victim tunnel by dynamically changing at least one of the source and destination network addresses associated with the flow label of the VPN tunnel under attack. The source network address and the destination network address may comprise of any combination of port numbers, Internet Protocol (IP) addresses, and other information within a packet describing the source and destination devices.

In particular, the edge router 10A detecting the attack selects, from a set of standby network addresses, new network addresses for the destination address, source address, or both, that are associated with the two endpoints of the VPN tunnel (28). The victim edge router 10A conveys the new network addresses to the other edge router 10 and establishes a new tunnel using the new network addresses (30). Concurrently, the failover mechanism at the victim edge router 10 uses RSVP to cancel the reservation associated with the old tunnel (32), and installs a reservation for the new VPN tunnel (34). Thus, the packets over the new tunnel carry the new label, and are accommodated over this newly provisioned virtual link. The attack traffic still carries the old label associated with the old VPN tunnel. Accordingly, the virtual firewall installed at the SP router 8 by the new RSVP reservation protects this virtual access link, and consequently the VPN traffic from the attack traffic.

For an attacker 12 with no knowledge of the set of standby addresses associated with the two endpoints of a VPN tunnel, the VPN failover process described above appears unpredictable or "random". Accordingly, this VPN failover approach that reassigns the addresses of the two endpoints of a VPN flow upon detection of an attack can be referred to as "randomized failover." The term randomized is used here informally, and is not meant to imply randomness in the strict statistical sense.

Let the sets S1 and S2 represent all possible values that that may be assigned to the source and destination address components of a flow labeled (a,b). That is a∈S1 and b∈S2. Let |S1| and |S2| represent the cardinality of the sets S1 and S2, respectively. From the perspective of an external attacker 12 of the VPN flow labeled (a,b), the new label assigned to the VPN flow by the failover process can take any value from among |S1|*|S2| possibilities. The "address space diversity" refers to the quantity |S1|*|S2| that signifies the universe of possible values available to the randomized failover process for reconfiguring a VPN flow label when its flow is under attack.

The randomized failover approach for survivable VPN services makes use of the fact that, given sufficient address space diversity, it becomes extremely difficult for an external attacker 12 operating with limited time and resources to discern the new label associated with the reconfigured VPN flow and adapt the attack to disrupt the new VPN tunnel.

Referring again to FIG. 1, to further illustrate the techniques, consider the situation where only unicast Internet Protocol (IP) addresses are used for the endpoints of a packet tunnel of VPN 9. During initialization, edge router 10A uses RSVP to reserve bandwidth on access link 7A for the packet flow from edge router 10B with the flow label ($B_1$,$A_1$). Edge router 10B does the same for the flow from edge router 10A with label ($A_1$,$B_1$).

Suppose attacker 12 directs a spoofed packet flood with the same flow label at edge router 10A. Upon detection of this attack (as described earlier), edge router 10A selects a new label for the flow from edge router 10B to edge router 10A. The new label is derived by replacing one or both components of the current label of the VPN flow ($B_1$,$A_1$) with standby addresses maintained by edge router 10A for both endpoints of the tunnel. The newly selected flow, say ($B_3$, $A_4$), is then conveyed to the edge router 10B using a secure signaling channel between the edge routers 10.

Subsequently, both edge router 10A and edge router 10B cancel their initial reservations of access links 7A, 7B for the flows ($B_1$,$A_1$) and ($A_1$,$B_1$) respectively, and setup reservations for the newly configured flows ($B_3$, $A_4$) and ($A_4$,$B_3$). The attack traffic directed at edge router 10A with the old label of the VPN flow, i.e., ($B_1$,$A_1$), is filtered out of the provisioned virtual link at SP router 8A.

These reconfiguration techniques limit the range of addresses that can be selected by each of edge router 10 for the VPN tunnel end point. Consider an enterprise 4 that has been allocated 256 Class C IP addresses for each of LANs 14. Only a subset of these addresses will be available for use by the respective edge routers 10 for use as VPN tunnel endpoint addresses. This limitation in address space diversity limits the degree of protection provided by the survivable VPN service from flooding attacks.

Figure 3:
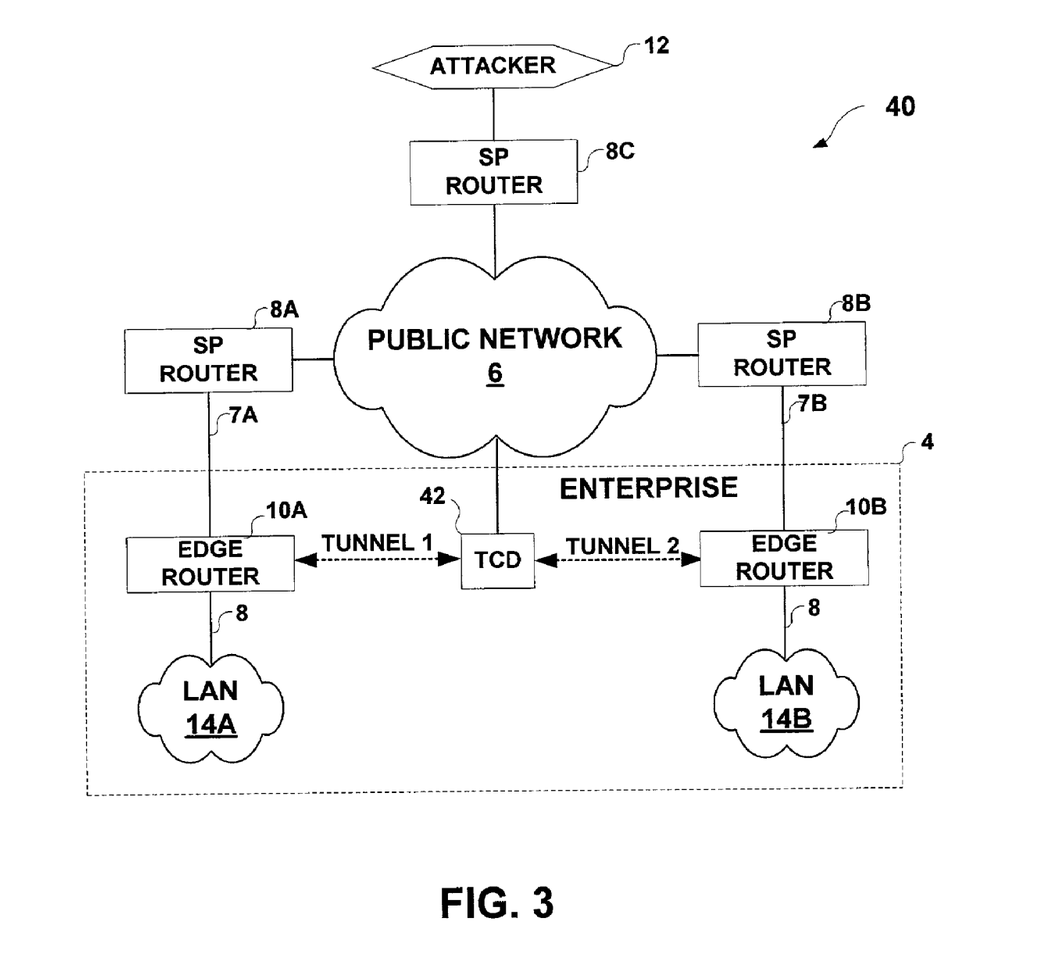
FIG. 3 is a block diagram of another system to protect the VPN against network attacks.

FIG. 3 is a block diagram of a system 40 that addresses the issue of limited address space diversity. In general, the techniques described above can be augmented with a mechanism referred to herein as VPN tunnel splitting. When an attack on a VPN tunnel is detected, edge routers 10 split the end-to-end tunnel between LANs 14 into two or more concatenated tunnels. Thus, instead of a direct tunnel between edge router 10A and edge router 10B that carries the VPN traffic, the VPN tunnel can be composed of two or more tunnels that are concatenated by a tunnel concatenation device (TCD) 42. Consequently, the VPN flow from edge router 10B to edge router 10A is redirected over Tunnel 2 to TCD 42. TCD 42 can be another edge router potentially owned by a third party with which enterprise 4 has established a trust relationship. TCD 42 de-encapsulates the packets received from edge router 10B, re-encapsulates the packets using one of the IP addresses allocated to TCD 42 as the source address and tunnels the packets over Tunnel 1 to edge router 10A. Any number of intermediate TCDs 42 may be configured between two VPN-enabled LAN sites with appropriate security associations between the TCDs 42 and the end points.

Referring to the VPN networking scenario above, let $TCD_1, TCD_2, \ldots, TCD_n$ be available TCDs configured to support the survivable VPN service between the LANs 14. Consider normal operating conditions where the VPN connection between edge router 10A (with address $A_1$) and edge router 10B (with address $B_1$) is a direct tunnel between edge routers 10, as described previously. That is, using RSVP, edge router 10A and edge router 10B provision bandwidth on respective access links 7A, 7B for the flows $(B_1,A_1)$ and $(A_1, B_1)$, respectively.

Consider the attack scenario above, where spoofed attack traffic with label $(B_1, A_1)$ is directed at edge router 10A to flood access link 7A. Upon detection of the attack, edge router 10A selects one of the TCDs configured for the VPN service, such as TCD 42, as the tunnel concatenation point for the packet flow between it and edge router 10B. Edge router 10B also selects one of the IP addresses assigned to TCD 42, such as $\alpha_1$, for the tunnel concatenation service. It then securely notifies edge router 10B to begin operating in split tunnel mode and provides edge router 10B the IP address $\alpha_1$ for the tunnel concatenation service. Subsequently, edge router 10B tunnels all VPN flows for LAN site 14B to TCD 42 over Tunnel 2 using IP address $\alpha_1$. This traffic flow now has the label $(B_1,\alpha_1)$. TCD 42 redirects this traffic over Tunnel 1 to edge router 10A. This traffic flow now has the label $(\alpha_1, A_1)$. Note that this traffic flow now carries the stream of VPN packets between LANs 14 that was carried by the direct tunnel, i.e., $(B_1,A_1)$ previously.

In addition to initiating actions to reconfigure the tunnel, edge router 10A cancels its existing RSVP reservation for the flow $(B_1,A_1)$ on access link 7A. It now provisions bandwidth on access link 7A for the redirected packets arriving from TCD 42, i.e., the flow with label $(\alpha_1, A_1)$. The attack traffic that was directed at edge router 10A with the spoofed label $(B_1,A_1)$ is filtered of this newly provisioned virtual link between SP router 8A and edge router 10A that has been established for the VPN traffic between the two LANs 14.

Conceptually, tunnel splitting may be viewed as facilitating the reconfiguration of the label of the flow from one LAN site to another without limiting the address space diversity that is available for performing this reconfiguration. The address space diversity with tunnel splitting is (size of the unicast IP address space)$^2$ *(number of source ports) *(number of destination ports) or approximately $56*10^{27}$.

Thus, it greatly increases the survivability of the VPN service compared to label reconfiguration with direct tunnels. However, this comes at the price of additional per packet overhead incurred by the tunnel concatenation service in de-encapsulating and re-encapsulating the packets at TCD 42. Also, redundant hardware in the form of one or more TCDs is needed.

To prevent TCD 42 from being exploited by attacker 12 to amplify or reflect attack traffic, each tunneling packet arriving at TCD 42 is authenticated to verify that it originated at a source that is authorized to use TCD 42. TCD 42 discards any packet that fails this authentication and authorization check.

To further support continued operation of VPN 9 between LANs 14 in spite of a disruption of operation of TCD 42 (either because of a benign hardware failure or an intrusion-induced degradation), edge routers 10 periodically exchange VPN "heartbeat" messages. Each VPN heartbeat message carries with it the sequence number of the last tunneling packet that was transmitted by the edge router 10 sending the heartbeat message. Using this information, as well as the sequence number field of the received encapsulated packets, edge routers 10 can continually track the packet loss rate between consecutively received heartbeat messages. Accordingly, edge routers 10 can detect the loss or unacceptable degradation of an existing tunnel concatenation service by the occurrence of one of the following events: (1) failure to receive VPN heartbeat messages over some period of time (specified at system configuration); and (2) observed packet loss rates over a specified threshold.

Assuming edge router 10A detects a degradation or loss of the tunnel concatenation service for an existing split tunnel between LANs 14A, edge router 10A reconfigures the split tunnel. It does this by selecting an alternate TCD from the set of TCDs maintained by it for the VPN service, choosing a network address from the candidate addresses for the new TCD, and notifying edge router 10B of the address of the new TCD. Also, edge router 10A cancels the current RSVP reservation for the existing tunnel from the existing TCD, and provisions bandwidth within access link 7A for the new tunnel from the selected TCD.

In addition to unicast network addresses, the techniques discussed herein may readily make use of multicast network addresses. Referring again to FIG. 1, each of the two unidirectional encapsulated packet flows within VPN 9 may use a multicast network address as the destination of the flow and a unicast address as the source network address. In this configuration, each of edge routers 10 maintains a set of alternate multicast network addresses to assign to packet flows terminating on it and a set of alternate unicast network addresses for packet flows originating from it.

The tunnel reconfiguration technique described makes use of source specific multicast (SSM), which is an extension of the traditional IP multicast service defined by IETF RFC 1112. The service provided by SSM is a "channel" that is uniquely identified by the SSM address M and a source IP address S. A range of IP multicast addresses, i.e., 232.0.0.0 to 232.255.255.255, has been reserved by the IANA for use by this service. A source S transmits IP datagrams to a destination M. To receive these datagrams a receiver must subscribe to the channel (S,M). Version 3 of IGMP supports mechanisms for such channel subscriptions by a receiver.

Let $MA_1, MA_2, MA_3, \ldots MA_n$ and $A_1, A_2, A_3, \ldots, A_n$ be the sets of alternate SSM multicast and unicast IP addresses, respectively, maintained by edge router 10A, and let $MB_1, MB_2, MB_3, \ldots, MB_m$ and $B_1, B_2, B_3, \ldots, B_m$ be the SSM multicast and unicast addresses at edge router 10B.

Suppose the VPN tunnel starts operation using the labels $(A_1, MB_1)$ and $(B_1, MA_1)$ for the two unidirectional flows between edge router 10A and edge router 10B. In this case, these flows are carried on the SSM channels $(A_1, MB_1)$ and $(B_1, MA_1)$ respectively. Thus, the flow labels also identify the SSM channels.

In setting up the survivable tunnel between the LANs 14, edge router 10A and edge router 10B subscribe to the SSM channels $(B_1, MA_1)$ and $(A_1, MB_1)$, respectively. Using RSVP, edge router 10A provisions bandwidth on access link 7A for the flow $(B_1, MA_1)$ and edge router 10B does the same on access link 7B for the flow $(A_1, MB_2)$.

Suppose the spoofed attack traffic originating from attacker 12 is directed at edge router 10A. That is, the attack traffic carries the label $(B_1, MA_1)$ which is currently assigned to the flow from edge router 10B to edge router 10A. Upon detecting the attack (using the mechanism described earlier), edge router 10A chooses a new label for the flow by selecting an alternate address for either or both of the components of the original flow label. Edge router 10A then unsubscribes from the SSM channel $(B_1, MA_1)$ and subscribes to the channel associated with the newly configured flow label, say $(B_3, MA_1)$. Also, edge router 10A cancels its RSVP reservation of access link 7A for the flow $(B_1, MA_1)$ and makes a reservation for the newly configured flow, i.e., $(B_3, MA_1)$.

When edge router 10A cancels its subscription to the SSM channel $(B_1, MA_1)$, the multicast routing protocol implementing the SSM service prunes the multicast tree to remove all branches that do not have subscribers under them. This pruning process results in the attack traffic originating at attacker 12 directed at edge router 10A, to be filtered out at SP router 8C. Thus, this organic technique enables environment 2 to automatically squelch the spoofed packet flood close to the source of the attack traffic. Accordingly, the spoofed packet flood is filtered before it even enters public network 6. Any attack traffic directed at the unicast addresses of edge router 10A, however, continues to be handled by the virtual firewall at SP router 8A that protects the provisioned virtual link within access link 7A for the VPN 9.

The address space diversity of this technique is $2^{40}$ times the size of unicast address space of the source edge router 10. The unicast address space for the source edge router 10 is determined by the number of addresses allocated to the respective LAN 14 by the service provider. As described earlier, this limitation on the size of the unicast address space of the source can be overcome by the tunnel splitting mechanism described earlier. With tunnel splitting, the direct tunnel between edge router 10B and edge router 10A is split into two tunnels that are concatenated by a TCD, as described earlier in reference to FIG. 2. The tunnel between the source edge router 10 and TCD 42 uses unicast addresses for both end points. However, the tunnel for the flow between TCD 42 and the destination edge router 10 uses an SSM multicast address for the destination. Tunnel splitting increases the size of the unicast address space of the source to that of the unicast address space of the Internet (i.e., approximately 3.8 billion addresses). The address space diversity with this technique is therefore approximately $25*10^{25}$.

The technique described above for tunnel reconfiguration using SSM multicast address can also be adapted for use with ordinary Internet Protocol (IP) multicast addresses. In this case, the destination multicast IP address component of a flow must be changed during tunnel reconfiguration if attack traffic is to be filtered out close to the source. If only the source IP address component of the flow label is changed to accomplish tunnel reconfiguration, attack traffic filtering occurs at the SP router 8 of the victim LAN 14 as in the case of tunnel reconfiguration with unicast addressing.

Comparing the address space diversity of the two techniques (multicast addressing and unicast addressing) for tunnel reconfiguration, and assuming the use of tunnel splitting for both cases, we see that tunnel reconfiguration with unicast addressing has a substantially larger address space diversity compared to the multicast addressing technique ($56*10^{27}$ vs. $25*10^{25}$). On the other hand, the multicast addressing approach has a distinct advantage over unicast in that it filters out the attack traffic close to the attacker 12, thereby protecting much of public network 6 from the traffic flood. In the unicast addressing approach, in contrast, the packet flood makes it to the SP router 8 connecting the victim LAN 14 to public network 6 where the attack traffic is handled by the virtual firewall. Thus, in this case, public network 6 is transporting the attack traffic and, therefore, wasting more resources.

Figure 4:
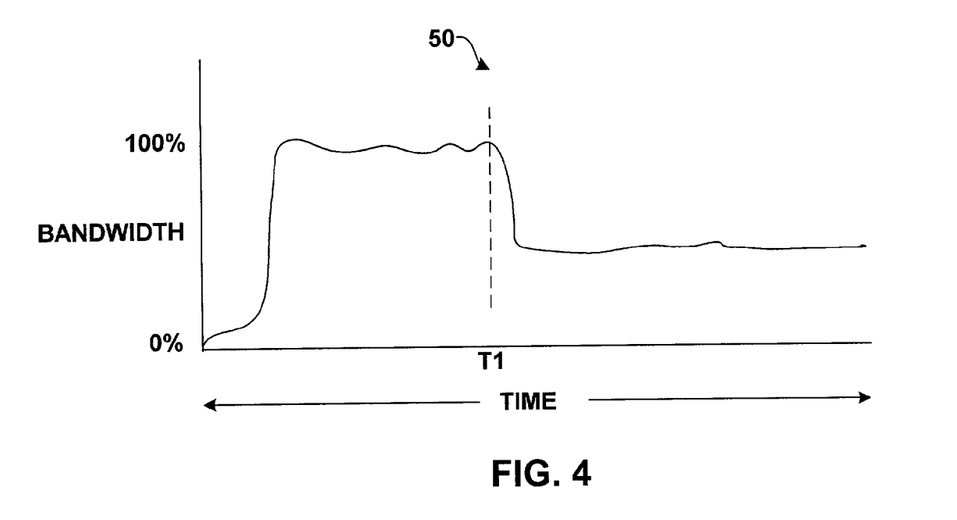
FIGS. 4 and 5 are graphs illustrating the example impact on a flooding attack on an access link while the VPN survivability techniques described herein are disabled and enabled, respectively.
Figure 5:
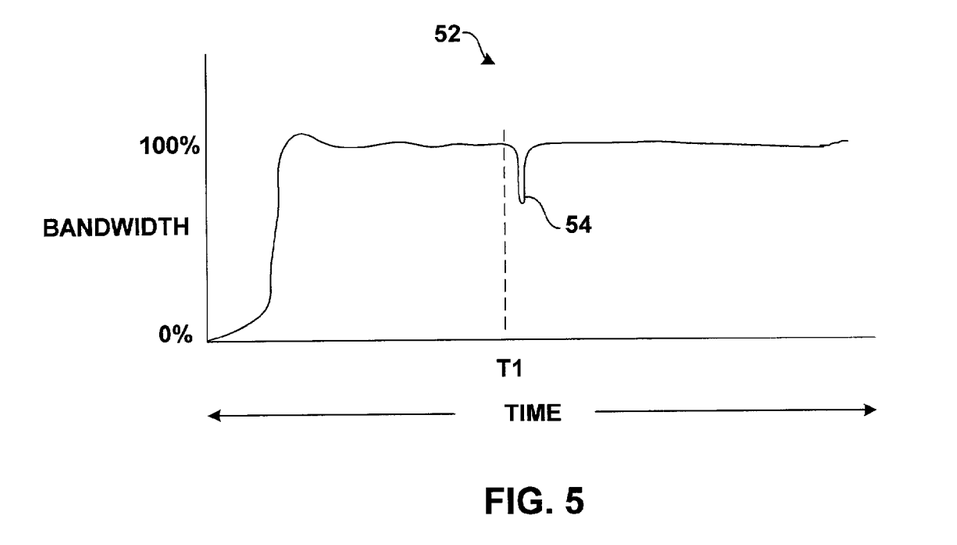

FIGS. 4 and 5 are graphs illustrating the example impact on a flooding attack while the VPN survivability techniques described herein are disabled and enabled, respectively. Referring to FIG. 4, graph 50 illustrates that without the survivability techniques enabled, the packet arrival rate at the receiving client may drop by a significant portion, often exceeding 50%, following the onset of the attack at a time T1. In contrast, as shown by graph 52 in FIG. 5, the attack traffic has no substantial deleterious impact on the packet arrival rates at the client when the survivable VPN services were enabled. A small downward spike 54 representing a momentary drop on the packet arrival rate following the onset of the attack may be noticed. However, this may have little or no adverse impact on the communication between the clients.

Various embodiments of the invention have been described. These and other embodiments are within the scope of the following claims.

The invention claimed is:

1. A method comprising:

establishing a packet tunnel between a first local area network and a second local area network, the packet tunnel having a source network address within an address space of the first local area network and a destination network address within an address space of the second local area network;

reserving for the packet tunnel an amount of bandwidth within an access link;

detecting a network attack;

in response to the detected network attack, splitting the packet tunnel by selecting an intermediate network device, wherein the intermediate network device has a network address from a network address space other than the address space of the first local area network and the address space of the second local area network, wherein the first local area network and the second local area network are separated by a public network, and wherein the intermediate network device has a network address from a network address space of the public network;

establishing a first packet tunnel from the first local area network to the intermediate network device;

establishing a second packet tunnel that originates from the intermediate network device to the second local area network;

canceling the reserved bandwidth for the packet tunnel;

reserving for the second packet tunnel an amount of bandwidth within the access link; and communicating a virtual private network (VPN) traffic from the first local area network to the second local area network by redirecting the VPN traffic from the first local area network to the intermediate network device through the first packet tunnel and forwarding the VPN traffic from the intermediate network device to the second local area network through the second packet tunnel.

2. The method of claim 1, wherein the source network address and the destination network address comprise port numbers.

3. The method of claim 1, wherein the source network address and the destination network address comprise Internet Protocol (IP) addresses.

4. The method of claim 1, wherein detecting a network attack comprises detecting an attack on the access link coupling a destination network device to a network.

5. The method of claim 1, further comprising exchanging a set of available network addresses between a source network device originating the packet tunnel and a destination network device terminating the packet tunnel, wherein the set of available network addresses correspond to a plurality of intermediate network devices.

6. The method of claim 1, wherein splitting the packet tunnel by selecting an intermediate device comprises:
maintaining a set of available network addresses for a plurality of available intermediate network devices, wherein the network addresses are within network address spaces other than the address space of the first local area network and the address space of the second local area network; and
selecting one of the network addresses.

7. The method of claim 1, further comprising:
upon detecting a network attack, sending a message from a destination network device for the packet tunnel to a source network device for the packet tunnel instructing the source network device to establish the first packet tunnel with the intermediate network device.

8. The method of claim 7, further comprising:
establishing a secure signaling channel between the source network device and the destination network device; and
sending the message via the secure signaling channel.

9. The method of claim 1, further comprising
de-encapsulating at the intermediate network device packets received from the first packet tunnel; and
re-encapsulating the packets at the intermediate network device for communication via the second packet tunnel.

10. The method of claim 1, further comprising:
establishing a secure signaling channel between a source network device and a destination network device;
sending via the secure signaling channel control packets between the source network device and the destination network device to monitor the performance of the first and second packet tunnels; and
selecting a new intermediate network device when the performance reaches a minimum threshold.

11. The method of claim 10, further comprising maintaining a set of possible intermediate network devices for a plurality of available intermediate network devices, wherein the network addresses are within network address spaces other than the address space of the first local area network and the address space of the second local area network, and wherein selecting the intermediate network device comprises selecting one of the possible intermediate network devices from the set.

12. The method of claim 1, wherein reserving an amount of bandwidth comprises sending a reservation message from a destination network device terminating the packet tunnel to a service provider access device.

13. The method of claim 12, wherein sending a reservation message comprises sending the reservation message according to the Resource Reservation Protocol (RSVP).

14. The method of claim 1, wherein establishing a packet tunnel comprises:
maintaining a set of available multicast network addresses;
selecting one of the multicast network addresses for the packet tunnel; and
subscribing to a multicast channel for the selected multicast network address.

15. The method of claim 14, wherein establishing a second packet tunnel comprises:
unsubscribing to the multicast channel;
selecting one of the multicast network addresses for a new destination network address;
establishing the second packet tunnel using the new destination network address; and
subscribing to a multicast channel for the selected multicast network address.

16. A method comprising:
establishing a virtual private network service including a packet tunnel having a source network address within an address space of a first local area network and a destination network address within an address space of a second local area network;
reserving for the packet tunnel an amount of bandwidth within an access link;
detecting a network attack;
establishing a new virtual private network service upon detecting the network attack, by selecting an intermediate network device having a network address from a network address space other than the address space of the first local area network and the address space of the second local area network, wherein the first local area network and the second local area network are separated by a public network, and wherein the intermediate network device has a network address from a network address space of the public network;
establishing a first packet tunnel from the first local area network to the intermediate network device; and
establishing a second packet tunnel that originates from the intermediate network device to the second local area network;
canceling the reserved bandwidth for the packet tunnel after establishing the new virtual private network service; and
reserving for the second packet tunnel an amount of bandwidth within the access link upon canceling the reserved bandwidth for the packet tunnel.

17. The method of claim 16, wherein establishing a packet tunnel comprises:
maintaining a set of available multicast network addresses;
selecting one of the multicast network addresses for the destination network address of the packet tunnel; and
subscribing to a multicast channel for the selected multicast network address.

18. The method of claim 16, wherein detecting a network attack comprises detecting an attack on an access link coupling a destination network device to a network.

19. A system comprising
a source device coupled to a first local area network; and
a destination device coupled to a second local area network,
wherein the source device and the destination device establish a packet tunnel having a source network address within an address space of the first local area network and a destination network address within an address space of the second local area network, reserve for the packet tunnel an amount of bandwidth within an access link, upon detecting a network attack, select a new network address from a network address space other than the address space of the first local area network and the address space of the second locale area network, and split the packet tunnel by establishing a first packet tunnel from the first local area network to an intermediate network device having the new network address and establishing a second packet tunnel from the intermediate network device to the second local area,
wherein the first local area network and the second local area network are separated by a public network, and wherein the intermediate network device has a network address from a network address space of the public network,
wherein the destination device cancels the reserved bandwidth for the packet tunnel after the second packet tunnel is established, and reserves for the second packet tunnel an amount of bandwidth within the access link upon canceling the reserved bandwidth for the packet tunnel, and
wherein the source device communicates virtual private network (VPN) traffic from the first local area network to the second local area network by redirecting the VPN traffic from the first local area network to the intermediate network device through the first packet tunnel for forwarding the intermediate network device to the second local area network through the second packet tunnel.

20. The system of claim 19, wherein the source network address and the destination network address comprise port numbers.

21. The system of claim 19, wherein the source network address and the destination network address comprise Internet Protocol (IP) addresses.

22. The system of claim 19, wherein the destination device and the source device comprise edge routers that couple local area networks to the public network.

23. The system of claim 19, wherein the destination device detects an attack on an access link coupling the destination device to the public network.

24. The system of claim 19, wherein the destination device and the source device exchange a set of available network addresses for the source network address and the destination network address of the packet tunnel.

25. The system of claim 19, wherein the destination device comprises a storage medium to store a set of available network addresses for use as the source network address and the destination network address of the packet tunnel.

26. The system of claim 19, wherein the intermediate network device de-encapsulates packets received from the first packet tunnel and re-encapsulates the packets for communication to the destination device via the second packet tunnel.

27. The system of claim 19, wherein the source device and the destination device establish a secure signaling channel and send via the secure signaling channel control packets to monitor the performance of the first and second packet tunnels.

28. The system of claim 27, wherein the destination device selects a new intermediate network device when the performance reaches a minimum threshold.

29. A computer-readable medium comprising instructions to cause a processor to:
establish a packet tunnel having a source network address within an address space of a first local area network and a destination network address within an address space of a second local area network;
reserve for the packet tunnel an amount of bandwidth within an access link;
detect a network attack;
in response to the detected network attack, split the packet tunnel by selecting an intermediate network device, wherein the intermediate network device has a network address from a network address space other than the address space of the first local area network and the address space of the second local area network, wherein the first local area network and the second local area network are separated by a public network, and wherein the intermediate network device has a network address from a network address space of the public network;
communicate the network address to a source device for the packet tunnel for establishing a first packet tunnel from the first local area network to the intermediate network device;
establish a second packet tunnel that originates from the intermediate network device to the second local area network;
cancel the reserved bandwidth for the packet tunnel;
reserve for the second packet tunnel an amount of bandwidth within the access link; and
receive virtual private network (VPN) traffic that was redirected from the first local area network to the intermediate network device through the first packet tunnel and forwarded the VPN traffic from the intermediate network device to the second local area network through the second packet tunnel.

30. The computer-readable medium of claim 29, further comprising instructions to cause the processor to select the intermediate network device by:
maintaining a set of available network addresses; and
selecting one of the network addresses.

* * * * *